UNITED STATES PATENT OFFICE.

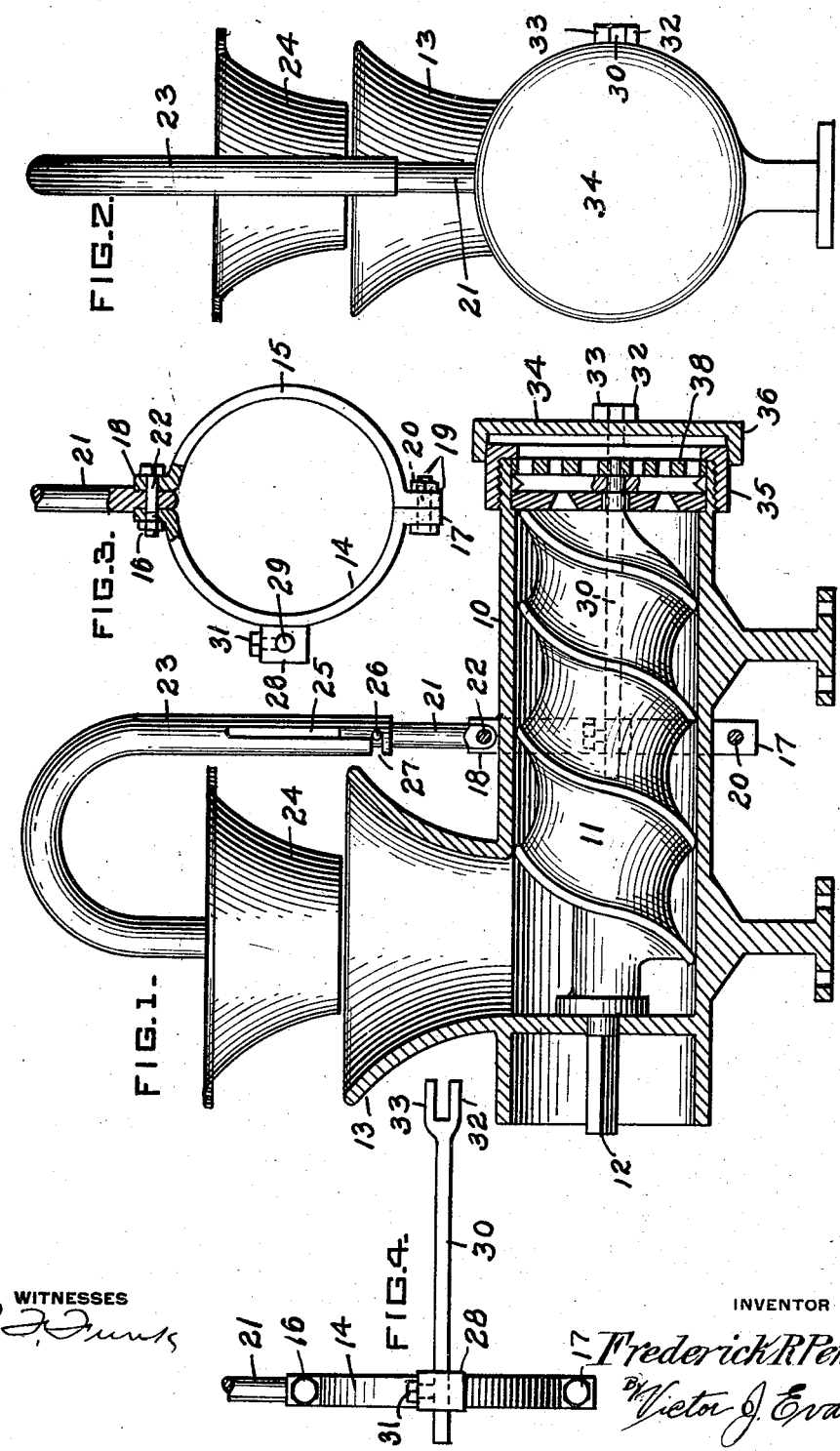

FREDERICK R. PERSHING, OF BRADDOCK, PENNSYLVANIA.

FOOD-CHOPPER.

1,211,343.  Specification of Letters Patent.  Patented Jan. 2, 1917.

Application filed June 28, 1916. Serial No. 106,500.

*To all whom it may concern:*

Be it known that I, FREDERICK R. PERSHING, a citizen of the United States, residing at Braddock, in the county of Allegheny and State of Pennsylvania, have invented new and useful Improvements in Food-Choppers, of which the following is a specification.

This invention relates to food choppers, disintegrators, grinders and the like.

One of the objects of the invention is to provide means whereby a machine of the class above enumerated may be maintained in a sanitary condition when in use.

I have shown my invention as applied to a meat grinder although it is apparent that it is adapted for use in connection with any machine of an analogous nature and I would therefore have it understood that my invention is not limited to use in connection with the particular mechanism shown.

In the drawings, Figure 1, is a longitudinal sectional view through a meat grinder to which my invention is applied. Fig. 2, is an end elevational view of the same. Fig. 3, is an end view of the standard securing a band, part of the said band being shown in section, and, Fig. 4, is a side elevational view of the end cover securing a rod.

Referring now to the drawings by numerals of reference, 10 designates the casing of a meat grinder provided with the usual feed worm 11, which may be driven by any suitable power from the end 12. 13 is the hopper into which the food is placed preparatory to being fed to the front end of the machine by the worm 11. Secured about the body of the grinder 10 is a supporting ring, best shown in Fig. 3, as consisting of the semicircular parts 14 and 15. The part 14 is provided with outwardly projecting lips 16 and 17 which correspond with the lips 18 and 19 upon the ends of the member 15. The ends 17 and 19 are adapted to be secured together by the fastening device 20 which may be of the well known nut and bolt construction. Between the ends 16 and 17 is secured a standard 21, held fast to the lips 16 and 18. The standard 21 extends a sufficient distance above the shell or casing of the machine and has sleeved thereupon a tubular telescoping member 23 in the form of a goose neck, on one end of which is a weighted hopper-closing member 24.

The member 23 is provided with a bayonet slot 25, the vertical portion of which may register with a guide pin 26 upon the standard 21 whereby the closing device 24 may be guided vertically in the hopper 13. When the lateral portion 27 of the bayonet slot is engaged by the pin, the member 23 will be held against vertical movement and inasmuch as the lateral portion 27 of the slot extends a considerable distance around the member 23 the closing device 24 may be swung to one side out of line with the member 13.

On the member 14 of the split ring is a lug 28 having an opening 29 to receive a rod 30 which is held in place by a set screw 31. The rod 30 is provided with a forked end 32 to receive a hinged part 33 on an end-closing device or door 34. The rod 30 extends from the ring to a point adjacent the front end of the machine casing 10 so that the door may be swung over the threaded ring 35. It is usual for the ring 35 to have lugs or projections thereon and I prefer to have the door 34 sufficiently concave to permit the flange 36 to fit over the ring 35 as shown in Fig. 1.

When the parts are assembled as shown in Fig. 1, and the hopper is filled with food to be ground, the end door-closure 34 may be swung to one side and by applying power to the worm the food will be forced through the perforate end plate 38 in the usual manner. The closing device 24, however, will act as a follower, guided by the pin and slot connection 25 and 26 and the liability of vermin, insects and bacteria getting into the hopper will be materially reduced, as the hopper will be automatically kept closed. The follower will continue to feed into the hopper until it has reached the limit of its movement. When the machine is not in use the follower will fit snugly within the hopper so as to keep out flies, bugs and other extraneous matter. Likewise when the machine is not in use the door 34 will be closed as shown in Figs. 1 and 2.

My invention is particularly adapted for attachment to any of the standard types of machines now upon the market and it can easily be applied without changing the construction of the original machine.

From the foregoing it will be apparent that according to my invention the interior of the food chopper or grinder will be kept sanitary and the liability of objectionable matter getting into the machine will be materially reduced.

What I claim is:—

1. The combination with a casing of a food grinding machine, of a band around the casing, a standard supported upon the band, a sleeve on the standard and a follower carried by the sleeve.

2. A casing of a food grinding machine, having a hopper, a standard removably supported upon the casing, a sleeve having a reciprocatory and a rotary movement and a hopper-closer carried by the sleeve.

3. A casing of a food grinding machine having a hopper, a standard upon the casing, a lug on the standard, a sleeve on the standard and provided with a bayonet slot to engage the lug, and a hopper closer upon the end of the sleeve.

4. In combination with a food grinding machine of the character described, a band encircling said casing and a hopper closer having slidable and rotatable connection with said band.

5. In combination with a food grinding machine of the class described, a band encircling and clamped to said casing and closures having swinging connection with said band for closing the hopper and exit end of the casing.

In testimony whereof I affix my signature.

F. R. PERSHING.

Copies of this patent may be obtained for five cents each, by addressing the "Commissioner of Patents, Washington, D. C."